(12) United States Patent
Wismeth

(10) Patent No.: US 6,861,652 B2
(45) Date of Patent: Mar. 1, 2005

(54) APPARATUS FOR THE DISINFECTION OF AQUEOUS MEDIA

(76) Inventor: Wolfgang Wismeth, Hans-Vogel-Str. 22, Fürth (DE), 90765

(*) Notice: Subject to any disclaimer, the term of this patent is extended or adjusted under 35 U.S.C. 154(b) by 0 days.

(21) Appl. No.: 10/036,865

(22) Filed: Dec. 21, 2001

(65) Prior Publication Data

US 2002/0131906 A1 Sep. 19, 2002

Related U.S. Application Data

(63) Continuation of application No. PCT/DE00/01913, filed on Jun. 10, 2000.

(30) Foreign Application Priority Data

Jun. 22, 1999 (DE) ...................................... 299 10 816 U

(51) Int. Cl.[7] ............................ H01J 37/20; B67D 5/06
(52) U.S. Cl. .................. 250/455.11; 422/105; 422/108; 422/116; 222/185.1; 222/190
(58) Field of Search ....................... 250/455.11, 504 R; 222/185.1, 190; 422/105; 210/87, 85, 198.1

(56) References Cited

U.S. PATENT DOCUMENTS

| | | | | |
|---|---|---|---|---|
| 4,762,613 A | * | 8/1988 | Snowball | 210/192 |
| 5,628,895 A | * | 5/1997 | Zucholl | 210/85 |
| 5,843,309 A | * | 12/1998 | Mancil | 210/205 |
| 5,846,418 A | * | 12/1998 | Thompson et al. | 210/266 |
| 6,074,550 A | * | 6/2000 | Hofmann et al. | 210/87 |
| 6,180,003 B1 | * | 1/2001 | Reber et al. | 210/198.1 |
| 6,224,751 B1 | * | 5/2001 | Hofmann et al. | 210/85 |
| 6,451,202 B1 | * | 9/2002 | Kuennen et al. | 210/136 |
| 6,491,811 B2 | * | 12/2002 | Conrad et al. | 210/85 |
| 6,569,319 B2 | * | 5/2003 | Kuennen et al. | 210/85 |

* cited by examiner

Primary Examiner—John R. Lee
Assistant Examiner—Kalimah Fernandez

(57) ABSTRACT

The apparatus for the disinfection of aqueous media in a tank wherein the media is exposed to ultraviolet radiation from a tubular watertight UV source, an electronic control unit is attached to the tank for the control of the UV source, the container is provided with a cover that can be tilted open and has a handle and the source is arranged substantially along a middle axis of the apparatus.

6 Claims, 2 Drawing Sheets

APPARATUS FOR THE DISINFECTION OF AQUEOUS MEDIA

CROSS-REFERENCE TO RELATED APPLICATIONS

This application is a continuation of PCT/DE00/01913 filed Jun. 10, 2000 and claims priority from German application 299 10 816.3 filed Jun. 22, 1999.

BACKGROUND OF THE INVENTION

1. Field of the Invention

The present invention relates to an apparatus for the disinfection of aqueous media in a tank by exposing the media to ultraviolet radiation from a tubular watertight UV source, an electronic control unit being attached to the tank for the control of the UV source and the container being provided with a cover that can be tilted open and has a handle and the source is arranged substantially along a middle axis of the apparatus.

2. Description of the Prior Art

Water that is contaminated with viruses, bacteria or parasites resents a major problem worldwide. Often there is no access to large-scale facilities which can purify drinking water by means of filtration, chlorination or ozonization. In recent years, ultraviolet radiation has been used for disinfection, where the preferred UV-C spectrum has a wavelength of 254 nm. Watertight radiation source units made of quartz glass are known which are used as immersion units. However, as a rule these are medium-sized to large disinfection facilities, which are also partly based on through-flow.

For example, an apparatus with a rigidly mounted UV lamp and a water intake and outflow is known from DE-U-94 20 752.

A container with a fixed UV radiation source in an immersion bell is known from DE-C-25 27 009. Finally, an energy-intensive alternative to such treatment is to boil the water for about 10 minutes to ensure a sufficient degree of disinfection.

A portable filter cartridge with a power supply and a specially designed transport case is disclosed in PCT-WO97/06108.

SUMMARY OF THE INVENTION

An object of the present invention is to create an apparatus for the disinfection of aqueous media which can be operated at a very low rate of energy, which is extremely flexible in application, is easily portable and can provide fairly small amounts of disinfected water in a short period of time, also ensuring a high degree of operational safety.

This object is achieved with an apparatus for the disinfection of aqueous media in a tank by exposing the media to ultraviolet radiation from a tubular watertight UV source, an electronic control unit being attached to the tank for the control of the UV source and the container being provided with a cover that can be tilted open and has a handle and the source is arranged substantially along a middle axis of the apparatus.

The invention relates to an apparatus for the disinfection of aqueous media, in particular for the production of drinking water, whereby the aqueous medium is exposed to ultraviolet radiation, and whereby this radiation originates in a tubular watertight UV source, characterized in that the source is rigidly arranged in a container that the container is provided with an electronic control unit for controlling the source, and that the electronic control unit is provided with a connection for a power supply.

Preferably the electronic control unit and the source are operated with about 12 Volt direct current (10.5 V to 14.5 V), whereby this current can be obtained by means of a transformer from the primary power supply, although according to a preferred embodiment it is provided in the form of solar power. In principle, however, it is also possible to design the control unit such that the apparatus can be operated from the primary power supply.

Preferably the container is provided with a bottoms and the electronic control unit is arranged in a housing below the bottom. The apparatus is activated by plugging it into an outlet or by means of a circuit closer. Preferably there is a circuit closer for the electronic control unit, and the die electronic control unit is provided with a timer which shuts off the apparatus after a certain period of time. Of course, a cut-out switch can also be provided instead. Preferably, the container is provided with a cover, and the opening of the container triggers the shutdown of the source.

According to one preferred embodiment of the invention, the cross section of the apparatus is substantially round or oval, whereby it resembles a conventional water kettle, and the source is arranged substantially along its middle axis on the bottom and connected through same with the control unit.

The apparatus can be provided with a heating arrangement for the aqueous medium.

According to one preferred embodiment of the invention, the apparatus is designed as a set with a power supply and a solar module.

DESCRIPTION OF THE SEVERAL VIEWS OF THE DRAWING

Below, the apparatus of the invention is more closely described with reference to the drawings, where.

DESCRIPTION OF THE PREFERRED EMBODIMENT(S)

Figure 1:
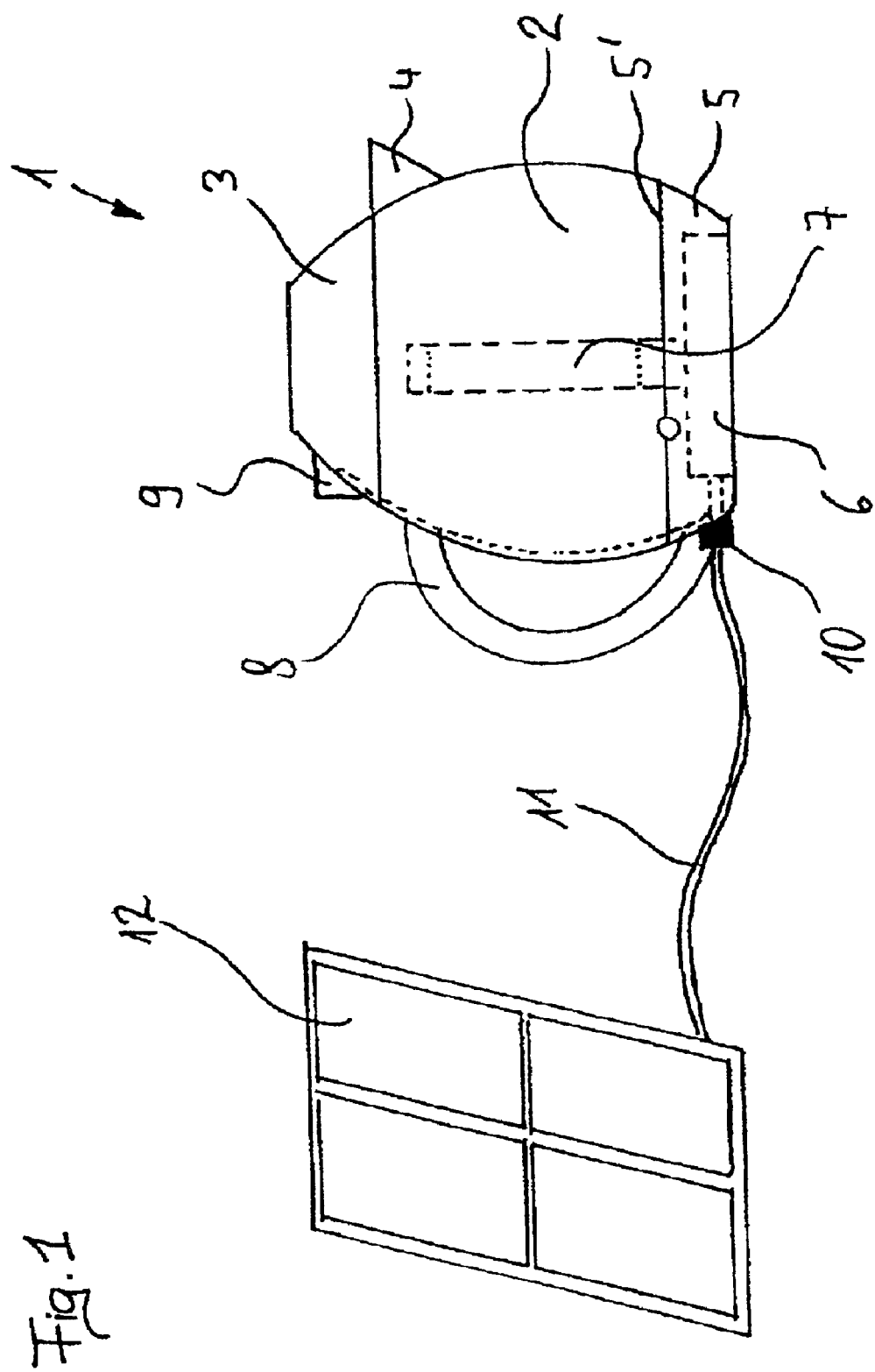
FIG. 1 shows a schematic view of a set consisting of the apparatus, a power supply and a solar module.

FIG. 1 shows an apparatus 1 according to the invention with a container, e.g., tea kettle, 2, a cover 3 that can be tilted open, a bottom 5' and a housing 5 separated from same. Apparatus 1 has a conventional handle 8 and a grommet 4. In housing 5 under bottom 5', an electronic control unit 6 is arranged, which is connected to a power outlet 10 for a power supply 11, which is connected to a solar module 12 and which supplies the electronic control unit 6 with 12 V direct current. Electronic control unit 6 controls a UV-source 7, which is arranged in container 2 standing vertically on bottom 5'. Apparatus 1 is provided with a circuit closer 9, with which the UV source can be turned on.

Figure 2:
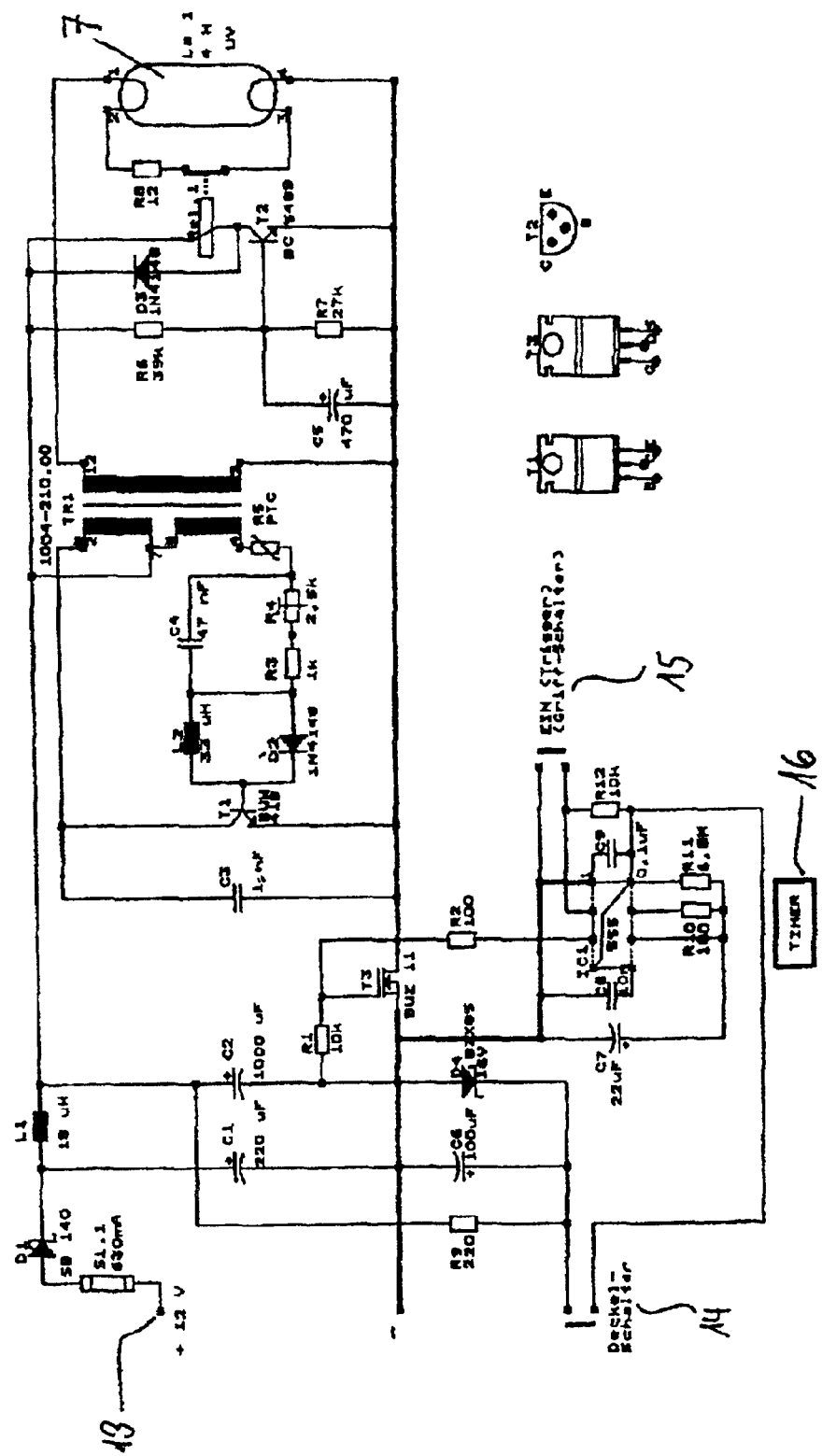
FIG. 2 shows a circuit diagram of the electronic control unit.

FIG. 2 shows a circuit diagram which demonstrates the other characteristics of the electronic control unit 6, which consists of conventional elements such as transistors T, an IC, diodes D, capacitors C, resistors R, etc., and which is mounted on a circuit board. The circuit has an input 13 for the 12 V direct current. The apparatus is turned on with circuit closer 15. After a certain period of time has elapsed (e.g. 2–6 minutes), which is the suitable period for ensuring sufficient disinfection, shutdown is triggered by a timer 16 activated as the apparatus is turned on. However, if cover 3 is opened before this period has elapsed, the apparatus is automatically turned off by cover switch 14, to protect the eyes of the operator. Control unit 6 supplies and switches UV source 7, which can, for example, accommodate a power of 4 W.

I claim:

1. Apparatus for the disinfection of aqueous media, in particular for the production of drinking water, comprising a household type container in which an aqueous medium is exposed to ultraviolet radiation, and this radiation is provided by a tubular watertight UV source rigidly mounted to a bottom of said container, said UV source having one of a round or oval cross section and being arranged in said container substantially along an upstanding middle axis of said container (2), an electronic control unit (6) mounted to said container (2) for the control of the UV source (7), said electronic control unit (6) including a connection (10) to a power supply, a circuit closer for the electronic control unit (6) and a timer (16), said electronic control unit (6) being constructed and arranged so that the electronic control unit (6) turns the apparatus (1) off after a certain period of time, said apparatus further including a cover (3) for said container (2) that is constructed and arranged so that said cover can be titled, and said container including a handle (8) which enables said container to be tilted open and said electronic control unit (6) being constructed and arranged so that the electronic control unit (6) turns the apparatus (1) off upon opening of the tiltable cover.

2. Apparatus according to claim 1, characterized in that said electronic control unit (6) and the UV source (7) are selected for operation with 12 Volt direct current.

3. Apparatus according to claim 1, characterized in that said electronic control unit (6) is mounted in a housing (5) under said bottom of said container (2).

4. Apparatus according to claim 1, characterized in that said electronic control unit (6) includes switching circuitry associated with said cover whereby the opening of the container (2) triggers the shutdown of the UV source (7).

5. Apparatus according to claim 2, characterized in that said apparatus includes a power supply and a solar module (12).

6. Apparatus for the disinfection of aqueous media, in particular for the production of drinking water, comprising a household type container in which an aqueous medium is exposed to ultraviolet radiation, and this radiation is provided by a tubular watertight UV source rigidly mounted to a bottom of said container, said UV source having one of a round or oval cross section and being arranged substantially along an upstanding middle axis of the container (2), an electronic control unit (6) mounted to said container (2) for the control of the UV source (7), said electronic control unit (6) including a connection (10) to a power supply, a circuit closer for the electronic control unit (6) and a timer (16), said electronic control unit (6) being constructed and arranged so that the electronic control unit (6) turns the apparatus (1) off after a certain period of time, said apparatus further including a cover (3) for said container (2), said container including a handle (8) which enables said container to be tilted open and said container (2) being provided with a heating arrangement for heating the aqueous medium.

\* \* \* \* \*